(12) United States Patent
Miyadera et al.

(10) Patent No.: US 8,194,266 B2
(45) Date of Patent: Jun. 5, 2012

(54) POSITIONAL ERROR DETECTION METHOD AND APPARATUS, AND COMPUTER-READABLE STORAGE MEDIUM

(75) Inventors: Tatsuya Miyadera, Osaka (JP); Kenji Asuwa, Kanagawa (JP); Izumi Kinoshita, Hyogo (JP); Hiroaki Ikeda, Osaka (JP); Tatsuya Ozaki, Osaka (JP); Yasuo Matsuyama, Hyogo (JP); Hirokazu Iwata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 805 days.

(21) Appl. No.: 12/333,621

(22) Filed: Dec. 12, 2008

(65) Prior Publication Data

US 2009/0161142 A1      Jun. 25, 2009

(30) Foreign Application Priority Data

Dec. 19, 2007   (JP) ................................. 2007-327773
Nov. 11, 2008   (JP) ................................. 2008-289134

(51) Int. Cl.
*G06F 3/12*      (2006.01)
*G06K 15/00*     (2006.01)

(52) U.S. Cl. ......... 358/1.14; 358/1.1; 358/1.5; 358/1.12
(58) Field of Classification Search ................... 358/1.1, 358/1.2, 1.3, 1.4, 1.5, 1.9, 1.11, 1.12, 1.13, 358/1.14, 1.15, 1.16, 1.17, 1.18
See application file for complete search history.

(56) References Cited

U.S. PATENT DOCUMENTS

| | | |
|---|---|---|
| 2008/0038024 A1 | 2/2008 | Miyadera |
| 2008/0069602 A1 | 3/2008 | Miyadera |
| 2008/0170868 A1 | 7/2008 | Miyadera |
| 2008/0212986 A1 | 9/2008 | Miyadera |

FOREIGN PATENT DOCUMENTS

JP      2003-266798      9/2003

*Primary Examiner* — Thierry Pham
(74) *Attorney, Agent, or Firm* — IPUSA, PLLC

(57) ABSTRACT

A positional error detection method forms, on a belt which is transported in a transport direction, positional error detection marks for detecting a positional error between image positions of first and second colors, detects the positional error detection marks on the belt, and computes the positional error based on the detected positional error detection marks. The positional error detection marks include first and second marks which are inclined in mutually opposite directions with respect to the transport direction, and third marks which are perpendicular to the transport direction.

23 Claims, 9 Drawing Sheets

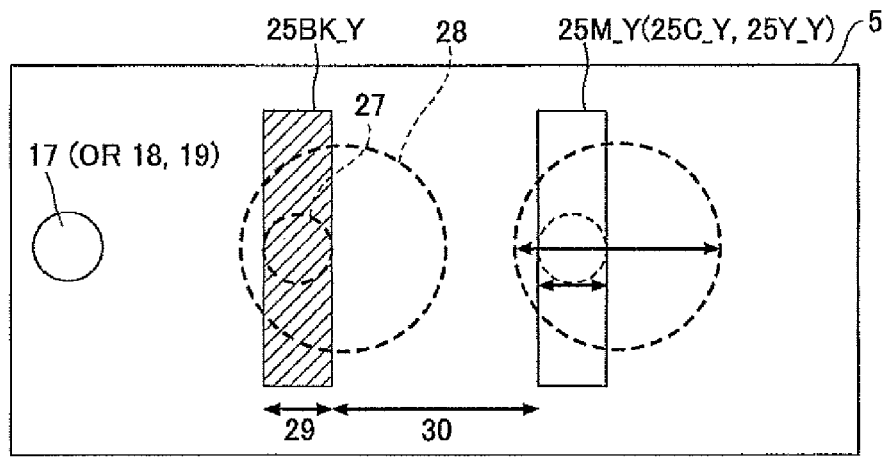
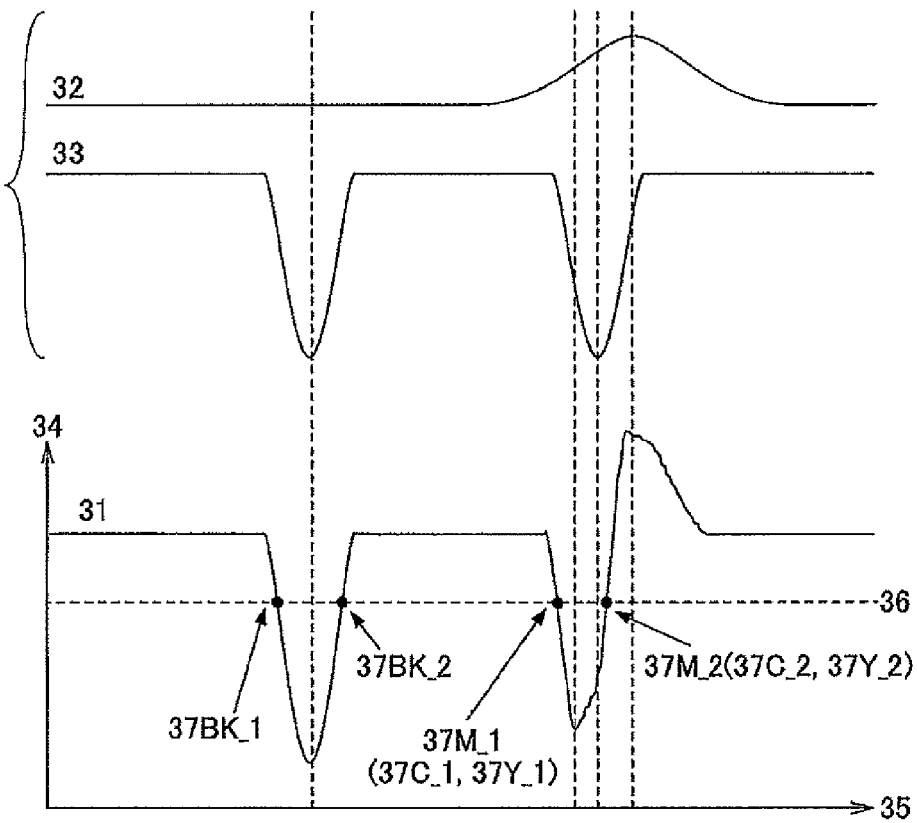

POSITIONAL ERROR DETECTION METHOD AND APPARATUS, AND COMPUTER-READABLE STORAGE MEDIUM

BACKGROUND OF THE INVENTION

1. Field of the Invention

The present invention generally relates to positional error detection methods and apparatuses and computer-readable storage media, and more particularly to a positional error detection (or color registration error detection) method and a positional error detection apparatus which detects an amount of positional error among images of a plurality of colors when overlapping the images of the plurality of colors to obtain a visible image in a tandem type image forming apparatus. The present invention also relates to a computer-readable storage medium which stores a program for causing a computer to execute such a positional error detection method.

2. Description of the Related Art

In the so-called tandem type image forming apparatus, an image forming means is provided for each of four colors, and toner images formed by the four image forming means are overlapped directly on a recording medium such as paper or, on an intermediate transfer belt, in order to form a color image.

In such a tandem type image forming apparatus, the overlapping positions of the images of the four colors slightly deviate from one another, to thereby prevent a stable color image from being formed. For this reason, a positional error (or color registration error) correction is carried out in general, as proposed in a Japanese Laid-Open Patent Application No. 2003-266698, for example. According to the positional error correction, a positional error correction mark is formed in each of the four colors, and image positions of the four colors are detected by a detecting means in order to match the overlapping positions of the four colors. In general, detection results of the color marks in cyan, magenta and yellow are compared with a detection result of the reference color mark in black, and the amount of positional error is computed for each color mark with respect to the reference color mark.

The reflected light detected by the detecting means includes a regular (or mirror) reflection light component and a diffused reflection light component. The regular reflection light that has been strongly reflected by a transport belt is absorbed by the toner image. On the other hand, the diffused reflection light that has been weakly reflected by the toner image of the color mark is absorbed by the transport belt and the black toner image.

Accordingly, when detecting the toner images of the color marks using the conventional detection method, the toner images are detected from the reflected light in which the regular reflection light component and the diffused reflection light component coexist. However, if the alignment of a light emitting element and a light receiving element of the detecting means with respect to an external or internal function of the apparatus is off or, the adjustment of the positional relationship of the light emitting element and the light receiving element are off due to mechanical tolerance, assembling error or the like, a peak position of the regular reflection light component and a peak position of the diffused reflection light component will not match. Consequently, there is a problem in that an error is introduced in the detected positions of the color marks.

SUMMARY OF THE INVENTION

Accordingly, it is a general object of the present invention to provide a novel and useful, positional error detection method and apparatus and computer-readable storage medium, in which the problems described above are suppressed.

Another and more specific object of the present invention is to provide a positional error detection method, a positional error detection apparatus and a computer-readable storage medium, which can improve the accuracy with which the amount of positional error between a mark of a reference color and a mark of a color other than the reference color is detected, using positional error detection marks having a predetermined pattern.

Still another object of the present invention is to provide a positional error detection apparatus comprising a belt configured to be transported in a transport direction; an image forming unit configured to form, on the belt, positional error detection marks in a first color which is used as a reference color and in a second color other than the first color that are for detecting a positional error between an image position of the first color and an image position of the second color; a reading unit configured to detect the positional error detection marks on the belt; and a computing unit configured to compute the positional error based on the positional error detection marks detected by the reading unit, wherein the positional error detection marks include first and second marks which extend linearly and are inclined in mutually opposite directions with respect to the transport direction, and third marks which extend linearly and are perpendicular to the transport direction. According to the positional error detection apparatus of the present invention, it is possible to improve the accuracy with which the amount of positional error between a mark of a reference color and a mark of a color other than the reference color is detected, using positional error detection marks having a predetermined pattern.

A further object of the present invention is to provide a positional error detection method comprising an image forming procedure forming, on a belt which is transported in a transport direction, positional error detection marks in a first color which is used as a reference color and in a second color other than the first color that are for detecting a positional error between an image position of the first color and an image position of the second color; a reading procedure detecting the positional error detection marks on the belt; and a computing procedure computing the positional error based on the positional error detection marks detected by the reading procedure, wherein the positional error detection marks include first and second marks which extend linearly and are inclined in mutually opposite directions with respect to the transport direction, and third marks which extend linearly and are perpendicular to the transport direction. According to the positional error detection method of the present invention, it is possible to improve the accuracy with which the amount of positional error between a mark of a reference color and a mark of a color other than the reference color is detected, using positional error detection marks having a predetermined pattern.

A further object of the present invention is to provide a computer-readable storage medium on which a program is stored, said program, when executed by a computer, causes the computer to perform a process comprising an image forming procedure forming, on a belt which is transported in a transport direction, positional error detection marks in a first color which is used as a reference color and in a second color other than the first color that are for detecting a positional error between an image position of the first color and an image position of the second color; a reading procedure detecting the positional error detection marks on the belt; and a computing procedure computing the positional error based on the positional error detection marks detected by the reading procedure, wherein the positional error detection marks include first and second marks which extend linearly and are inclined in mutually opposite directions with respect to the transport direction, and third marks which extend linearly and are perpendicular to the transport direction. According to the computer-readable storage medium of the present invention, it is possible to improve the accuracy with which the amount of positional error between a mark of a reference color and a mark of a color other than the reference color is detected, using positional error detection marks having a predetermined pattern.

Other objects and further features of the present invention will be apparent from the following detailed description when read in conjunction with the accompanying drawings.

BRIEF DESCRIPTION OF THE DRAWINGS

FIGS. 6A, 6B and 6C are diagrams for explaining the detection of positional error detection marks in the embodiment of the present invention;

DESCRIPTION OF THE PREFERRED EMBODIMENTS

Figure 1:
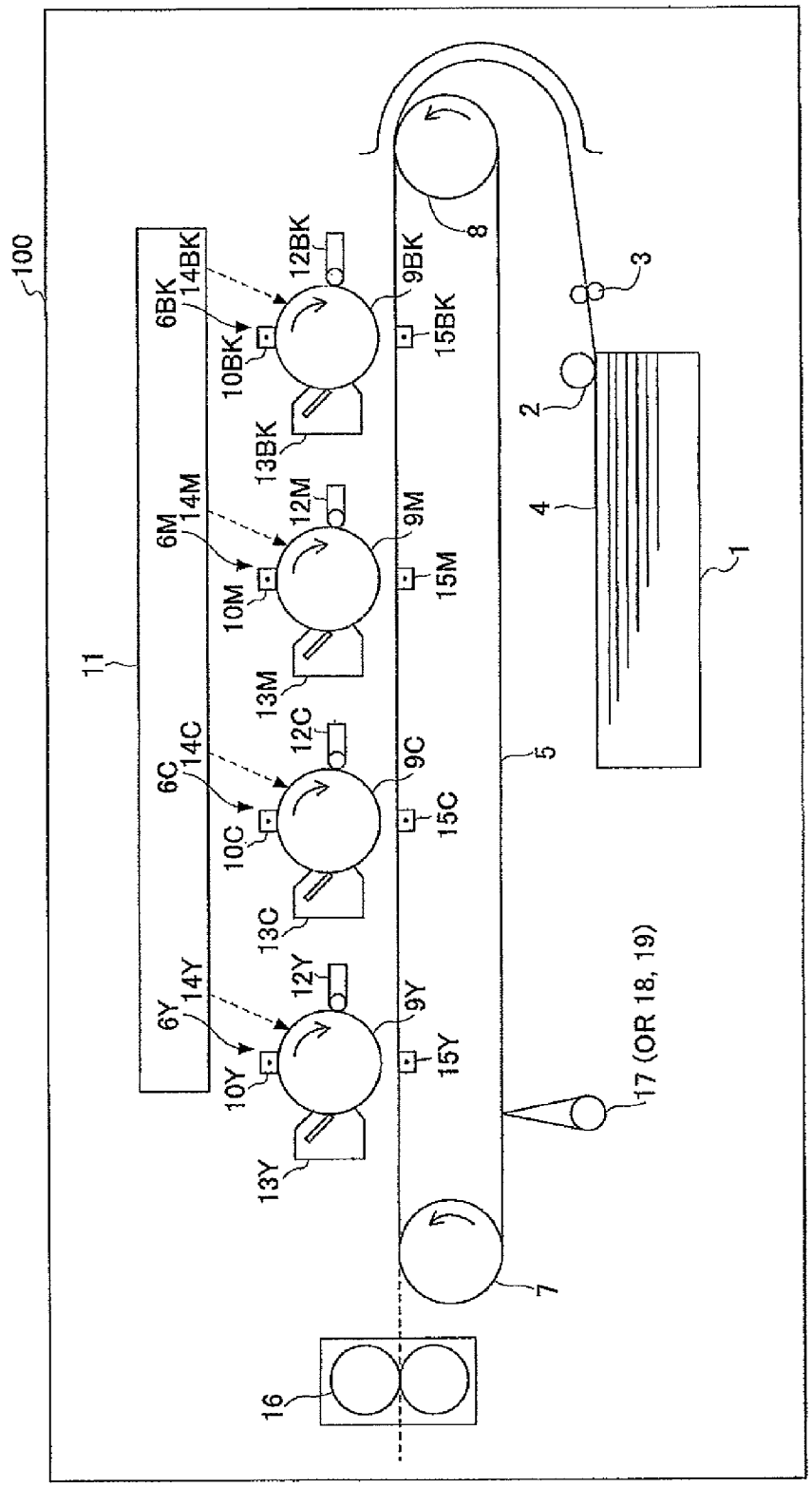
FIG. 1 is a diagram showing a structure of a positional error detection apparatus in an embodiment of the present invention.

A description will be given of embodiments of embodiments of the positional error (or color registration error) detection method and apparatus and the computer-readable storage medium according to the present invention, by referring to the drawings.

First, a description will be given of an image forming unit (or means) of the positional error detection apparatus in an embodiment of the present invention.

Operation of Image Forming Unit:

A description will be given of the image forming unit of the positional error detection apparatus in this embodiment, by referring to FIG. 1. FIG. 1 is a diagram showing a structure of the positional error detection apparatus in this embodiment of the present invention. FIG. 1 shows the structure of a positional error detection apparatus (or color registration error detection apparatus) 100 in an embodiment of the present invention, that is, an electrophotography type color image forming apparatus.

The color image forming apparatus in this embodiment includes a paper supply tray 1, a paper supply roller 2, a separation roller 3, recording paper (or any suitable recording media) 4, a transport belt (or a belt member) 5, image forming parts 6BK, 6M, 6C and 6Y, a driving roller 7, a following roller 8, photoconductive drums 9BK, 9M, 9C and 9Y, charging units 10BK, 10M, 10C and 10Y, an exposure unit 11, developing units 12BK, 12M, 12C and 12Y, discharge units 13BK, 13M, 13C and 13Y, transfer units 15BK, 15M, 15C and 15Y, a fixing unit 16, and sensors 17, 18 and 19. Laser beams 14BK, 14M, 14C and 14Y are exposure beams for exposing corresponding black, magenta, cyan and yellow images.

In the color image forming apparatus of this embodiment, the transport belt 5 forms an endless moving unit. The image forming parts 6BK, 6M, 6C and 6Y for forming the corresponding black magenta, cyan and yellow images are arranged along a transport direction of the transport belt 5 in this order from an upstream side towards a downstream side, and form the image forming unit (or means). The transport belt 5 transports the recording paper 4, which is fed by the paper supply roller 2 and the separation roller 3, towards the downstream side along the transport direction, that is, towards the fixing unit 16.

The plurality of image forming parts 6BK, 6M, 6C and 6Y form images with toners of mutually different colors, but have the same internal structure. Accordingly, in the following description, a description will be given of the constituent elements of the image forming part 6BK as an example, and a description of the other image forming parts 6M, 6C and 6Y will be omitted because the operations of the other image forming parts 6M, 6C and 6Y are the same as that of the image forming part 6BK.

The transport belt 5 is formed by an endless belt that is supported by the driving roller 7 and the following roller 8. The driving roller 7 is driven to rotate by a driving motor (not shown). This driving motor, the driving roller 7 and the following roller 8 function as a driving unit that drives the transport belt 8 as the endless moving unit.

When forming the image, the recording paper 4 accommodated in the paper supply tray 1 are successively supplied from the top recording paper 4, and each recording paper 4 adheres on the transport belt 5 due to electrostatic adhesion, The recording paper 4 on the transport belt 5 which is driven is transported first to the image forming part 6BK where a black toner image is transferred onto the recording paper 4.

The image forming part 6BK includes the photoconductive drum 9BK which is provided as a photoconductive body, and the charging unit 10BK, the exposure unit 11, the developing unit 12BK, a photoconductive drum cleaner (not shown), the discharge unit 13BK and the like are arranged in the periphery of the photoconductive drum 9BK. The exposure unit 11 irradiates the laser beams 14BK, 14M, 14C and 14Y as the exposure beams corresponding to the color images formed by the image forming parts 6BK, 6M, 6C and 6Y.

Figure 2:
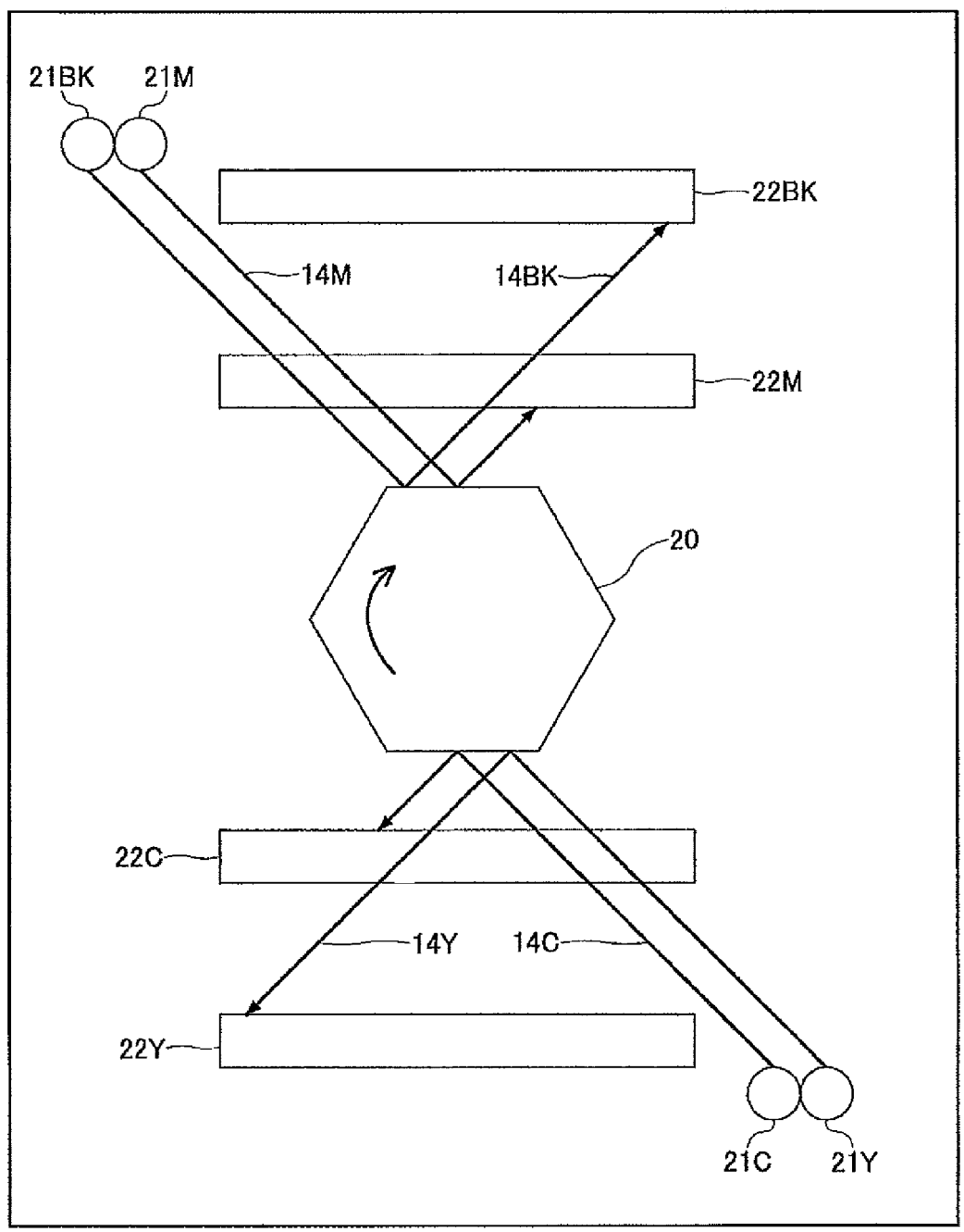
FIG. 2 is a diagram showing an internal structure of an exposure unit of the positional error detection apparatus in the embodiment of the present invention.

Next, a description will be given of the exposure unit 11, by referring to FIG. 2. FIG. 2 is a diagram showing an internal structure of the exposure unit 11 of the positional error detection apparatus in this embodiment of the present invention. The laser beams 14BK, 14M, 14C and 14Y which are used as the exposure beams corresponding to the color image formed by the image forming parts 6BK, 6M, 6C and 6Y are emitted from corresponding laser diodes 21BK, 21M, 21C and 21Y. The laser beams 14BK, 14M, 14C and 14Y are reflected by a polygonal mirror 20, and pass through corresponding optical systems 22BK, 22M, 22C and 22Y and adjusted of the respective optical paths, before scanning the corresponding surfaces of the photoconductive drums 9BK, 9M, 9C and 9Y. The polygonal mirror 20 has six reflection surfaces, and each reflection surface can cause the exposure beam to scan one line in a main scanning direction when the polygonal mirror 20 rotates. The single polygonal mirror 20 is used with respect to the laser beams 14BK, 14M, 14C and 14Y emitted from the four laser diodes 21BK, 21M, 21C and 21Y.

The exposure beams are grouped into two groups, namely, a first group of laser beams 14BK and 14M and a second group of laser beams 14C and 14Y, and the first and second groups of laser beams are irradiated on opposing reflection surfaces of the polygonal mirror 20. This configuration enables the exposure beams to be simultaneously expose the corresponding photoconductive drums 9BK, 9M, 9C and 9Y. Each of the optical systems 22BK, 22N, 22C and 22Y includes an fθ-lens for aligning the reflected light beams at equal intervals, and a deflection mirror for deflecting the laser beam.

When forming the image, the outer peripheral surface of the photoconductive drum 9BK is uniformly charged by the charging unit 10BK in the dark, and is thereafter exposed by the laser beam 14BK which is irradiated from the exposure unit 11 and corresponds to the black image, to thereby form an electrostatic latent image. The developing unit 12BK develops the electrostatic latent image into a visible image by the black toner, and as a result, the black toner image is formed on the outer peripheral surface of the photoconductive drum 9BK.

The black toner image on the photoconductive drum 9BK is transferred onto the recording paper 4 on the transport belt 5, by the transfer unit 15BK, at a transfer position where the photoconductive drum 9BK makes contact with the recording paper 4 on the transport belt 5. By this transfer process, the black toner image is formed on the recording paper 4.

The recording paper 4 which is formed with the black toner image by the image forming part 6BK is transported by the transport belt 5 to the next image forming part 6M. A process similar to that carried out by the image forming part 6BK is carried out by the image forming part 6M. Hence, a magenta toner image is formed on the outer peripheral surface of the photoconductive drum 9M, and this magenta toner image is transferred onto the recording paper 4 in an overlapping manner on the black toner image.

In addition, the recording paper 4 which is formed with the black and magenta toner images by the image forming parts 6BK and 6M is transferred by the transport belt 5 to the next image forming part 6C wherein a cyan toner image is transferred onto the recording paper 4 in an overlapping manner on the black and magenta toner images, and is thereafter transferred by the transport belt 5 to the next image forming part 6Y wherein a yellow toner image is transferred onto the recording paper 4 in an overlapping manner on the black, magenta and cyan toner images. As a result, a full color image is formed on the recording paper 4 by the overlapping black, magenta, cyan and yellow toner images. The recording paper 4 which is formed with the full color image is separated from the transport belt 5 and is supplied to the fixing unit 16 wherein the full color image is fixed, and the recording paper 4 is thereafter ejected outside the color image forming apparatus.

In the color image forming apparatus including the positional error detection apparatus 100 of this embodiment, the toner images of each of the colors may not overlap at the position of the reference color toner image where the toner images should overlap, and a positional error may be introduced among the colors. When the positional error occurs among the colors, it is necessary to correct the positional error of the toner images of each of the colors. In this embodiment, the positional error is corrected by matching the image positions of the three colors, namely, magenta, cyan and yellow, with respect to the image position of black. Of course, the positional error may be corrected using a reference color other than black.

Figure 3:
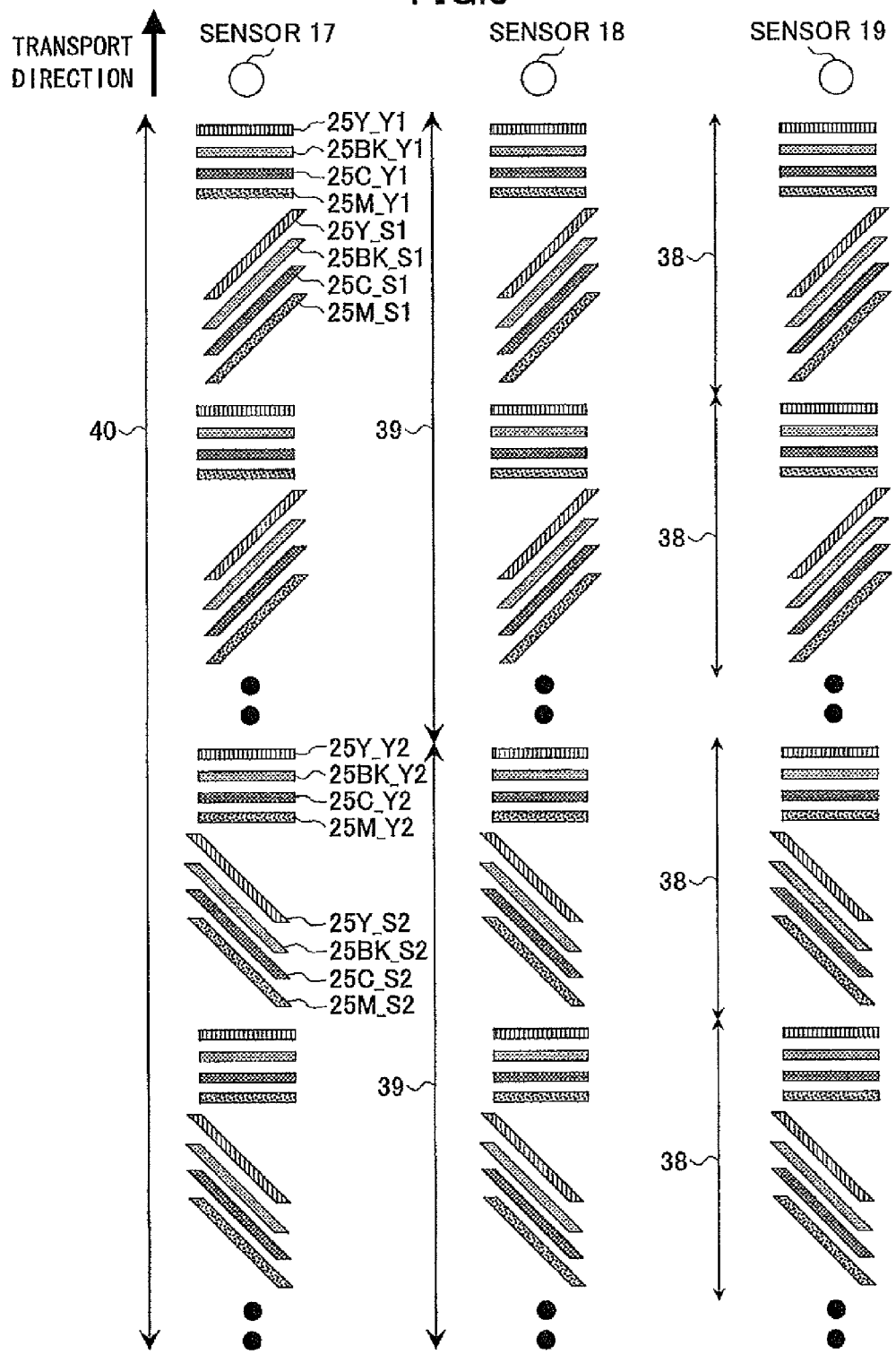
FIG. 3 is a diagram showing an example of a positional error detection pattern in the embodiment of the present invention.

Positional Error Detection Pattern:

Next, a description will be given of the structure of a positional error detection pattern, by referring to FIG. 3. FIG. 3 is a diagram showing an example of the positional error detection pattern in this embodiment. The positional error detection pattern has four colors, namely, black, magenta, cyan and yellow. The positional error detection pattern includes first positional error detection marks (or first oblique marks) 25BK_S1, 25M_S1, 25C_S1 and 25Y_S1, second positional error detection marks (or second oblique marks) 25BK_S2, 25M_S2, 25C_S2 and 25Y_S2, and third positional error detection marks (or third linear marks) 25BK_Y1, 25M_Y1, 25C_Y1 and 25Y_Y1, and 25BK_Y2, 25M_Y2, 25C_Y2 and 25Y_Y2. The first and second positional error detection marks 25BK_S1, 25M_S1, 25C_S1 and 25Y_S1, and 25BK_S2, 25M_S2, 25C_S2 and 25Y_S2 extend linearly but obliquely to the transport direction of the transport belt 5. The third positional error detection marks 25BK_Y1, 25M_Y1, 25C_Y1 and 25Y_Y1, and 25BK_Y2, 25M_Y2, 25C_Y2 and 25Y_Y2 extend linearly but perpendicularly to the transport direction of the transport belt 5. The eight positional error detection marks made up of the third and first positional error detection marks 25BK_Y1, 25M_Y1, 25C_Y1 and 25Y_Y1, and 25BK_S1, 25M_S1, 25C_S1 and 25Y_S1, form a first set. On the other hand, the eight positional error detection marks made up of the third and second positional error detection marks 25BK_Y2, 25M_Y2, 25C_Y2 and 25Y_Y2, and 25BK_S2, 25M_S2, 25C_S2 and 25Y_S2 form a second set.

Each of the first positional error detection marks 25BK_S1, 25M_S1, 25C_S1 and 25Y_S1, the second positional error detection marks 25BK_S2, 25M_S2, 25C_S2 and 25Y_S2, the third positional error detection marks 25BK_Y1, 25M_Y1, 25C_Y1 and 25Y_Y1, and the third positional error detection marks 25BK_Y2, 25M_Y2, 25C_Y2 are made up of black (BK), magenta (M), cyan (C) and yellow (Y) bar-shaped or strip patterns having a predetermined width (or line width).

The first and second positional error detection marks 25BK_S1, 25M_S1, 25C_S1 and 25Y_S1, and 25BK_S2, 25M_S2, 25C_S2 and 25Y_S2 extend obliquely to the transport direction of the transport belt 5 so that the inclinations (or slopes) are in opposite directions. In this embodiment, the first positional error detection marks 25BK_S1, 25M_S1, 25C_S1 and 25Y_S1 are inclined clockwise by an angle $\pi/4$ (or 45 degrees) with respect to the transport direction of the transport belt 5. The second positional error detection marks 25BK_S2, 25M_S2, 25C_S2 and 25Y_S2 are inclined counterclockwise by an angle $\pi/4$ with respect to the transport direction of the transport belt 5. However, the inclination angles of the first and second positional error detection marks 25BK_S1, 25M_S1, 25C_S1 and 25Y_S1, and 25BK_S2, 25M_S2, 25C_S2 and 25Y_S2 are not limited to $\pi/4$.

In addition, a period 38 of third positional error detection marks 25BK_Y1, 25M_Y1, 25C_Y1 and 25Y_Y1 in the transport direction of the transport belt 5 or, the period 38 of the first set in the transport direction of the transport belt 5, is equal to ⅓ the rotation period (or image formation period for one color) of each of the photoconductive drums 9BK, 9M, 9C and 9Y, for example, and may be equal to ½ the rotation period of the driving roller 7. The period 38 of the third positional error detection marks 25BK_Y2, 25M_Y2, 25C_Y2 and 25Y_Y2 in the transport direction of the transport belt 5 or, the period 38 of the second set in the transport direction of the transport belt 5, is equal to ⅓ the rotation period (or image formation period for one color) of each of the photoconductive drums 9BK, 9M, 9C and 9Y, and may be equal to ½ the rotation period of the driving roller 7. Hence, three first or second sets may be formed in one rotation period of each of the photoconductive drums 9BK, 9M, 9C and 9Y, in order to average the amount of positional error and cancel the deviation in the amount of positional error caused by an unstable rotation of each of the photoconductive drums 9BK, 9M, 9C and 9Y. The deviation in the amount of positional error caused by unstable rotation of the driving roller 7 may be cancelled in a similar manner. However, the correspondence between the period 38 and the image formation period for one color is not limited to that described above.

For example, if a total of twenty-four sets made up of twelve first sets and twelve second sets are formed as a positional error detection pattern group, a length 40 of this positional error detection pattern group in the transport direction of the transport belt 5 becomes equal to the circumference (or peripheral length of the loop) of the transport belt 5. In this case, it is possible to cancel a detection error caused by an unstable (or inconsistent) thickness or the like of the transport belt 5.

Of the twenty-four sets forming the positional error detection pattern group, the first twelve sets are made up solely of the first sets, and the latter (or second) twelve sets are made up solely of the second sets. The first twelve sets made up solely of consecutive first sets and the latter twelve sets made up solely of consecutive second sets both have a period 39 in the transport direction of the transport belt 5. For example, this period 39 may be equal to four rotation periods (or image formation periods for one color) of each of the photoconductive drums 9BK, 9M, 9C and 9Y or, equal to six rotation periods of the driving roller 7. However, the correspondence between the period 39 and the image formation periods for one color is not limited to that described above.

Accordingly, by continuously forming the first set which includes the first positional error detection marks 25BK_S1, 25M_S1, 25C_S1 and 25Y_S1 and the second set which includes the second positional error detection marks 25BK_S2, 25M_S2, 25C_S2 and 25Y_S2 for one or more rotation periods of each of the photoconductive drums 9BK, 9M, 9C and 9Y or, one or more rotation periods of the driving roller 7, it becomes possible to cancel the deviation in the positional error caused by unstable rotation of each of the photoconductive drums 9BK, 9M, 9C and 9Y or, the driving roller 7, using the first and second sets.

In the positional error detection apparatus 100 of this embodiment, the first positional error detection marks 25BK_S1, 25M_S1, 25C_S1 and 25Y_S1, the second positional error detection marks 25BK_S2, 25M_S2, 25C_S2 and 25Y_S2, and the third positional error detection marks 25BK_Y1, 25M_Y1, 25C_Y1 and 25Y_Y1, and 25BK_Y2, 25M_Y2, 25C_Y2 and 25Y_Y2 are formed on the transport belt 5 by a process similar to the process of forming the full color image on the recording paper 4. Hence, each of the image forming parts 6BK, 6M, 6C and 6Y forms an image forming part (or means) for forming the positional error detection marks.

In this embodiment, the transport belt 5 is a paper (or recording medium) transport belt. However, the transport belt 5 may be an intermediate transfer belt which transfers an image formed thereon onto the recording paper 4. In this case, the image forming unit (or means) for forming the positional error detection marks forms the positional error detection marks on the intermediate transfer belt.

Next, a description will be given of the sensors 17, 18 and 19 of the positional error detection apparatus 100. The sensors 17, 18 and 19 form a reading unit (or means) of the positional error detection apparatus 100.

Figure 4:
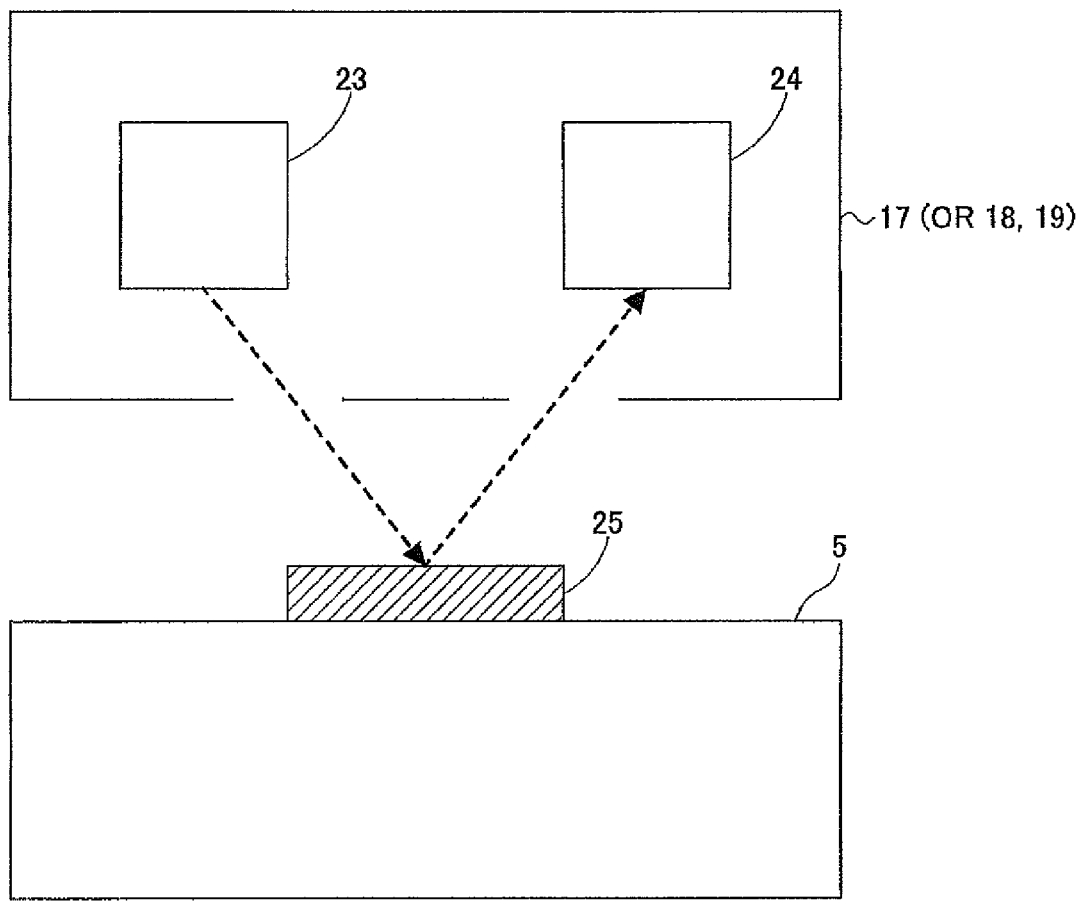
FIG. 4 is a diagram, on an enlarged scale, showing a sensor of the positional error detection apparatus in the embodiment of the present invention.
Figure 5:
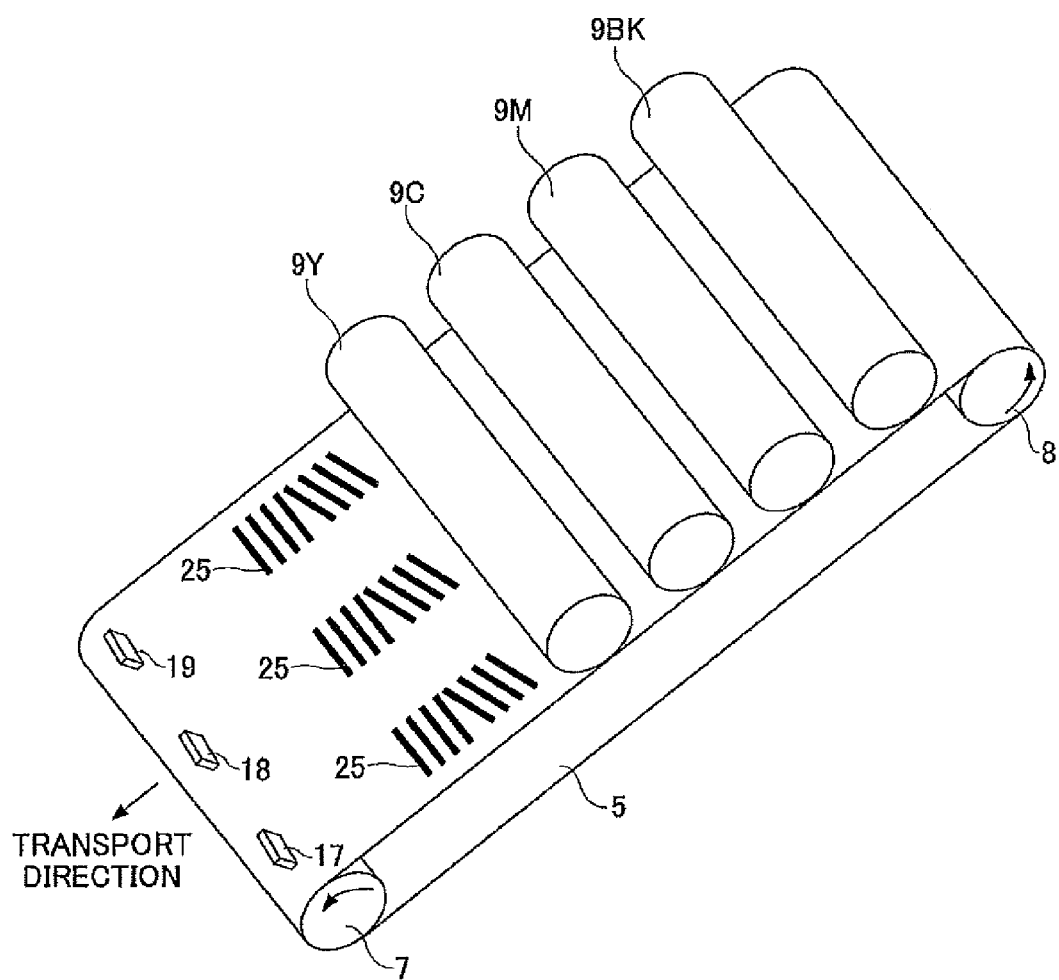
FIG. 5 is a perspective view showing the sensors and peripheral parts thereof of the positional error detection apparatus in the embodiment of the present invention.

Reading Unit:

A description will be given of the structure and operation of the sensors 17, 18 and 19 of the positional error detection apparatus 100 of this embodiment, by referring to FIGS. 4 and 5. FIG. 4 is a diagram, on an enlarged scale, showing the sensor 17 of the positional error detection apparatus 100 in the embodiment of the present invention. FIG. 5 is a perspective view showing the sensors 17, 18 and 19 and peripheral parts thereof of the positional error detection apparatus 100 in the embodiment of the present invention.

The sensor 17 includes a light emitting part 23 and a light receiving part 24 shown in FIG. 4. The light emitted from the light emitting part 23 is irradiated on a positional error detection mark 25 which is formed on the transport belt 5. The positional error detection mark 25 may be any of the first positional error detection marks 25BK_S1, 25M_S1, 25C_S1 and 25Y_S1, the second positional error detection marks 25BK_S2, 25M_S2, 25C_S2 and 25Y_S2, and the third positional error detection marks 25BK_Y1, 25M_Y1, 25C_Y1 and 25Y_Y1, and 25BK_Y2, 25M_Y2, 25C_Y2 and 25Y_Y2. The reflected light from the positional error detection mark 25 is received by the light receiving part 24, and the sensor 17 detects the positional error detection mark 5 based on the reflected light received by the light receiving part 24. Because each of the sensors 18 and 19 have the same structure as the sensor 17, a detailed description and illustration of the structure and operation of the sensors 18 and 19 will be omitted.

As shown in FIG. 5, the sensors 17, 18 and 19 are located at positions opposing the transport belt 5 and on the downstream side of the image forming part 6Y along the transport direction of the transport belt 5. Further, the sensors 17, 18 and 19 are arranged on a single substrate (not shown) along a direction perpendicular to the transport direction of the transport belt 5.

Detection of Positional Error Detection Mark:

A description will be given of the operating principle for detecting the positional error detection marks 25, by referring to FIGS. 6A, 6B and 6C. FIGS. 6A, 6B and 6C are diagrams for explaining the detection of the positional error detection marks 25 in this embodiment of the present invention. FIG. 6A shows beam spots irradiated on the transport belt 5. FIG. 6B shows a detected intensity 32 of the diffused reflection light component received by the light receiving part 24, and a detected intensity 33 of the regular reflection light component received by the light receiving part 24. FIG. 6C shows a detection result 31 of the reflected light received by the light receiving part 24. The detection result 31 is a sum of the detected intensities 32 and 33. In FIG. 6C, an ordinate 34 indicates an intensity of the detection result 31 of the reflected light received by the light receiving part 24, and an abscissa 35 indicates the time in arbitrary units.

The regular reflection light component refers to the reflection light which is reflected in a direction opposite to an incident direction of the irradiated light at an angle identical to an incident angle of the irradiated light. In other words, if the incident angle of the irradiated light is denoted by $\theta$, the reflection angle of the regular reflection light component can be denoted by $\theta-\pi$ (that is, $\theta$ minus $\pi$). On the other hand, the diffused reflection light component refers to the reflected light component other than the regular reflection light component.

Each of the sensors 17, 18 and 19 detects an edge of the positional error detection mark 25 at positions 37BK_1, 37BK_2, 37M_1, 37M_2, 37C_1, 37C_2, 37Y_1 and 37C_2 where the detection result 31 of the reflected light received by the light receiving part 24 intersects a threshold value 36 which is preset. In this embodiment, an image position is judged from a middle point between two edges detected from the positional error detection marks 25, such as the middle point of the positions (or edges) 37BK_1 and 37BK_2. However, it is of course possible to judge the image position from the edges 37BK_1, 37BK_2, 37M_1, 37M_2, 37C_1, 37C_2, 37Y_1 and 37C_2 detected from each of the positional error detection marks 25.

In order to improve a signal-to-noise ratio (S/N ratio), which is a ratio the intensity of the signal to be detected to the intensity of noise, when detecting the positional error detection marks 25 for the color registration, a line width 29 of the positional error detection mark 25 in the transport direction of the transport belt 5 is set equal to or approximately equal to a spot diameter 27 of the light irradiated on the transport belt 5. In addition, because the positional error detection mark 25 cannot be detected in a normal manner if the diffused reflection light components of the reflected lights from two positional error detection marks 25 are simultaneously received by the light receiving part 24, an interval (or pitch) 30 of the positional error detection marks 25 is set larger than a spot diameter 28 of the diffused reflection light component.

Generally, the diffused reflection light component has a property such that a component originated from the reflection at the black positional error detection mark 25 on the transport belt 5 is small but a component originated from the reflection at the magenta, cyan and yellow positional error detection marks 25 on the transport belt 5 is larger. Moreover, the regular reflection light component has a property such that a component originated from the reflection at the transport belt 5 is large, but includes no component originated from the reflection at the positional error detection marks 25 regardless of the color thereof because substantially no regular reflection occurs at the positional error detection marks 25 regardless of the color thereof.

Next, a case will be considered where an alignment error exists between the light emitting part 23 and the light receiving part 24 due to mechanical tolerance, assembling (or mounting) error or the like. In this case, the position where the regular reflection light component becomes a minimum and the position where the diffused reflection light component becomes a maximum shift with respect to the magenta, cyan and yellow positional error detection marks 25 as shown in FIG. 6C, due to the property of the diffused reflection light component described above. This means that there is an error between the minimum position of the regular reflection light component and the maximum position of the diffused reflection light component that are computed from the detection result 31 of the reflected light received by the light receiving part 24, and the actual minimum position of the regular reflection light component and the actual maximum position of the diffused reflection light component.

On the other hand, the position of the black positional error detection mark 25 can be detected solely from the detected intensity 33 of the regular reflection light component. For this reason, the position of the black positional error detection mark 25 computed from the detection result 31 of the reflected light received by the light receiving part 24 matches the actual position of the black positional error detection mark 25.

Therefore, an error (such as 41_Y and 41_S which will be described later) is introduced in the detected positions of the magenta, cyan and yellow positional error detection marks 25, and it is impossible to detect the accurate amount of the positional error.

Next, a description will be given of the mechanism (or means) for reducing the error in the detected positions of the magenta, cyan and yellow positional error detection marks 25 in the positional error detection apparatus 100 in this embodiment.

A description will first be given of a computing unit (or means) of the positional error detection apparatus 100 in this embodiment.

Figure 7:
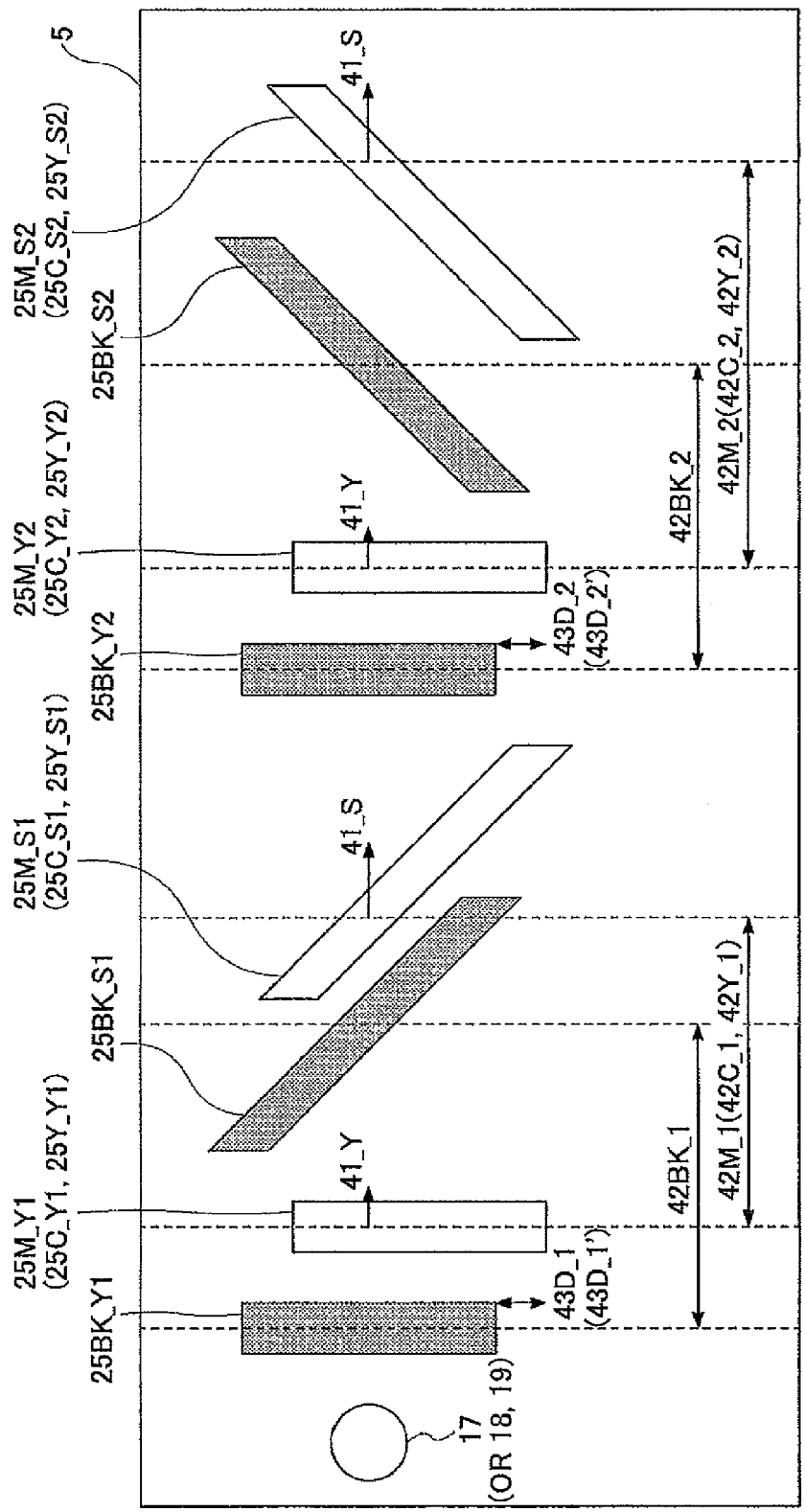
FIG. 7 is a diagram for explaining the positional error detection in the embodiment of the present invention.

Reduction of Error in Positional Error Detection:

A description will be given of the operating principle for reducing the error of the positional error detection using the positional error detection marks 25 of this embodiment, by referring to FIG. 7. FIG. 7 is a diagram for explaining the positional error detection in this embodiment of the present invention when the sensors 17, 18 and 19 detect the amount of positional error from the positional error detection marks 25.

FIG. 7 shows an example where the amount of positional error of the magenta image is computed from the black and magenta positional error detection marks 25. However, the amount of positional error of the cyan or yellow image with reference to the black image may be computed in a similar manner by using the cyan or yellow positional error detection mark 25 in place of the magenta positional error detection mark 25.

For the sake of convenience, FIG. 7 shows the sensor 17 (or 18 or 19) together with the first black positional error detection mark 25BK_S1, the first magenta positional error detection mark 25M_S1, the second black positional error detection mark 25BK_S2, the second magenta positional error detection mark 25M_S2, the third black positional error detection marks 25BK_Y1 and 25BK_Y2, and the third magenta positional error detection marks 25M_Y1 and 25M_Y2 on the transport belt 5.

In FIG. 7, 42BK_1 denotes an interval (or distance) between the third and first black positional error detection marks 25BK_Y1 and 25BK_S1, and 42BK_2 denotes an interval (or distance) between the third and second black positional error detection marks 25BK_Y2 and 25BK_S2. In addition, 42M_1 denotes an interval (or distance) between the third and first magenta positional error detection marks 25M_Y1 and 25M_S1, and 42M_2 denotes an interval (or distance) between the third and second magenta positional error detection marks 25M_Y2 and 25M_S2.

The middle point between the leading edge (or first detected edge) of the positional error detection mark 25 and the trailing edge (or second detected edge) of this positional error detection mark 25 which are detected by the corresponding sensor 17 (or 18 or 19) is used as the detected position of this positional error detection mark 25, for each of the positional error detection marks 25. However, it is of course possible to use the leading edge or the trailing edge of the positional error detection mark 25 which is detected by the corresponding sensor 17 (or 18 or 19) as the detected position of this positional error detection mark 25, for each of the positional error detection marks 25.

Next, amounts 43D_1 and 43D_2 of positional error (hereinafter also simply referred to as positional errors 43D_1 and 43D_2) in the direction perpendicular to the transport direction of the transport belt 5, which are computed from the respective first and second sets of the positional error detection marks 25, may be represented by the following formulas, if it is assumed that the absolute value of each of the inclination angles of the first and second magenta positional error detection marks 25M_S1 and 25M_S2 is $\pi/4$.

$$43D\_1 = 42BK\_1 - 42M\_1$$

$$43D\_2 = 42M\_2 - 42BK\_2$$

The detection error caused by the diffused reflection light component described above must be taken into consideration when computing the positional errors 43D_1 and 43D_2. For this reason, FIG. 7 shows the detection error 41_Y of the third magenta positional error detection marks 25M_Y1 and 25M_Y2, and the detection error 41_S of the first and second magenta positional error detection marks 25M_S1 and 25M_S2. It is assumed for the sake of convenience that the detection errors of the first and second magenta positional error detection marks 25M_S1 and 25M_S2 are both 41_S and have the same size.

In this case, because the intervals 42M_1 and 42M_2 are computed from the detection result 31 of the sensor 17, positional errors 43D_1' and 43D_2' in the direction perpendicular to the transport direction of the transport belt 5 when taking into account the detection error caused by the diffused reflection light component can be represented by the following formulas.

$$43D\_1' = 42BK\_1 - (42M\_1 + 41\_Y + 41\_S)$$

$$43D\_2' = (42M\_2 + 41\_Y + 41\_S) - 42BK\_2$$

The following formula stands because a positional error 43D of the magenta image with respect to the black image in the direction perpendicular to the transport direction of the transport belt 5 can be represented by an average value of the positional errors 43D_1' and 43D_2'.

$$\begin{aligned}
43D &= (43D\_1' + 43D\_2')/2 \\
&= [\{42BK\_1 - (42M\_1 + 41\_Y + 41\_S)\} + \\
&\quad \{(42M\_2 + 41\_Y + 41\_S) - 42BK\_2\}]/2 \\
&= \{42BK\_1 - 42M\_1 + (42M\_2 - 42BK\_2)\}/2 \\
&= (43D\_1 + 43D\_2)/2
\end{aligned}$$

It may be seen from the above formula that the detection errors 41_Y and 41_S caused by the diffused reflection light component can be cancelled when computing the positional error 43D. Accordingly, the detection accuracy of the positional error 43D for magenta in the direction perpendicular to the transport direction of the transport belt 5 is improved.

Figure 8:
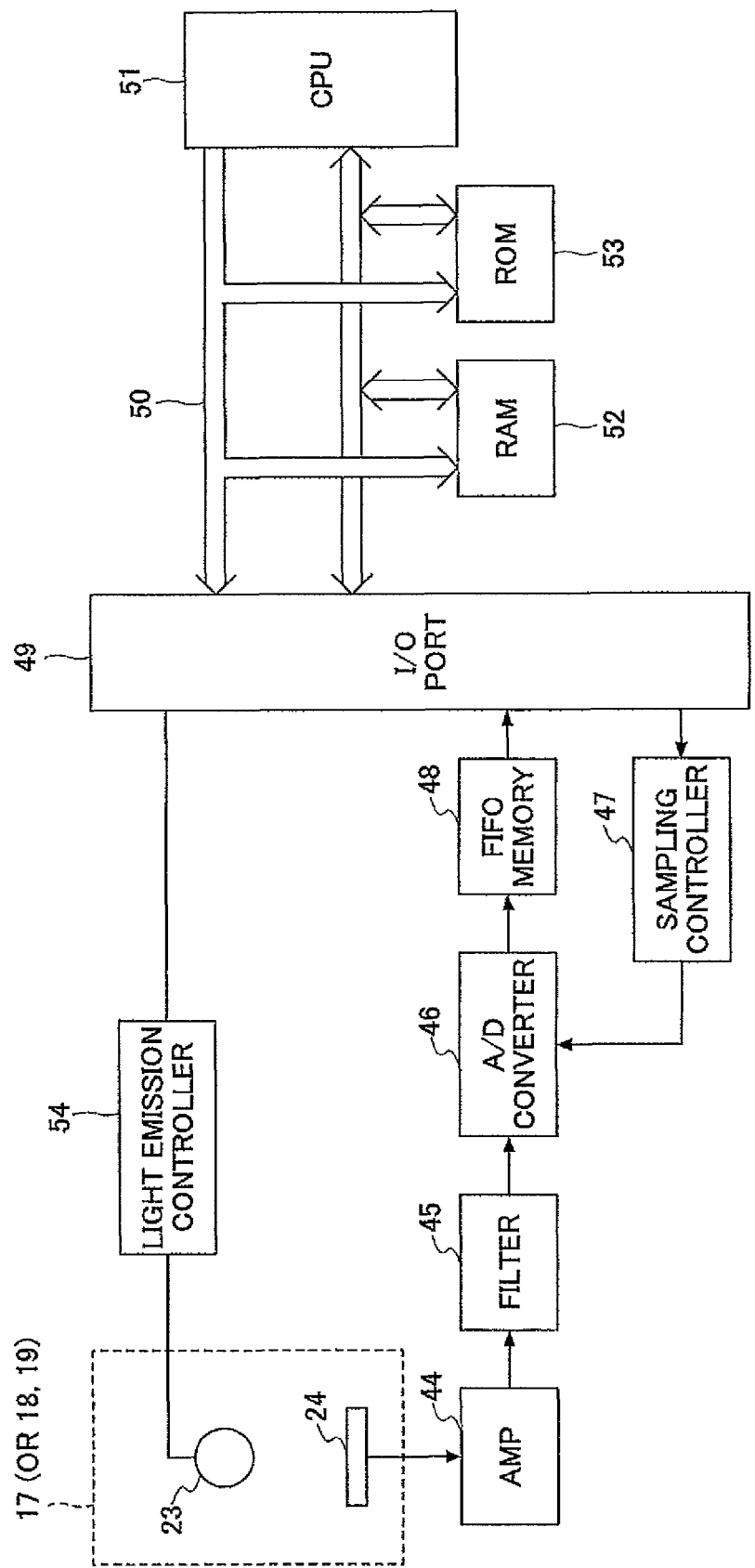
FIG. 8 is a block diagram showing a structure of a computing unit of the positional error detection apparatus of the embodiment of the present invention.

Computing Unit:

Next, a description will be given of the structure and operation of the computing unit (or means) of the positional error detection apparatus 100 of this embodiment, by referring to FIG. 8. FIG. 8 is a block diagram showing the structure of the computing unit of the positional error detection apparatus 100 of this embodiment of the present invention.

The computing unit of this embodiment includes an amplifier 44, a filter 45, an analog-to-digital (A/D) converter 46, a sampling controller 47, a first-in-first-out (FIFO) memory 48, an input/output (I/O) port 49, a data bus 50, a central processing unit (CPU) 51, a random access memory (RAM) 52, a read only memory (ROM) 53, and a light emission controller 54 which are connected as shown in FIG. 8.

A detection signal corresponding to the reflected light received by the light receiving part 24 is output from the light receiving part 24 and amplified by the amplifier 44. The filter 45 extracts only a signal component for detecting the positional error detection mark 25 from the amplified detection signal output from the amplifier 44. The extracted signal component from the filter 45 is converted into digital data by the A/D converter 46. The sampling performed in the A/D converter 46 is controlled by the sampling controller 47. Data obtained by the sampling performed in the A/D converter 46 is stored in the FIFO memory 48.

After the first and second sets of the black, magenta, cyan and yellow positional error detection marks 25 are detected, the data stored in the FIFO memory 48 are stored in the RAM 52 via the I/O port 49 and the data bus 50. Then, the CPU 51 performs a computing process to compute the amount of positional error described above with respect to the data stored in the RAM 52.

The ROM 53 stores various programs including a program for computing the amount of positional error described above, and a program for controlling the positional error detection apparatus 100 of this embodiment. In addition, the CPU 51 monitors the detection signal output from the light receiving part 24 at an appropriate timing, and controls the light emission of the light emitting part 23 via the light emission controller 54 so that it is possible to positively detect the positional error detection marks 25 even if the transport belt 5 and the light emitting part 23 deteriorate. Hence, the level of the detection signal output from the light receiving part 24 is always maintained constant by the CPU 51. The CPU 51 and the ROM 53 form a control unit (or means) for controlling the operation of the entire positional error detection apparatus 100 of this embodiment. In this embodiment, the ROM 53 forms a computer-readable storage medium. However, the computer-readable storage medium may be formed by any suitable storage or recording medium capable of storing a program in a computer-readable manner.

Figure 9:
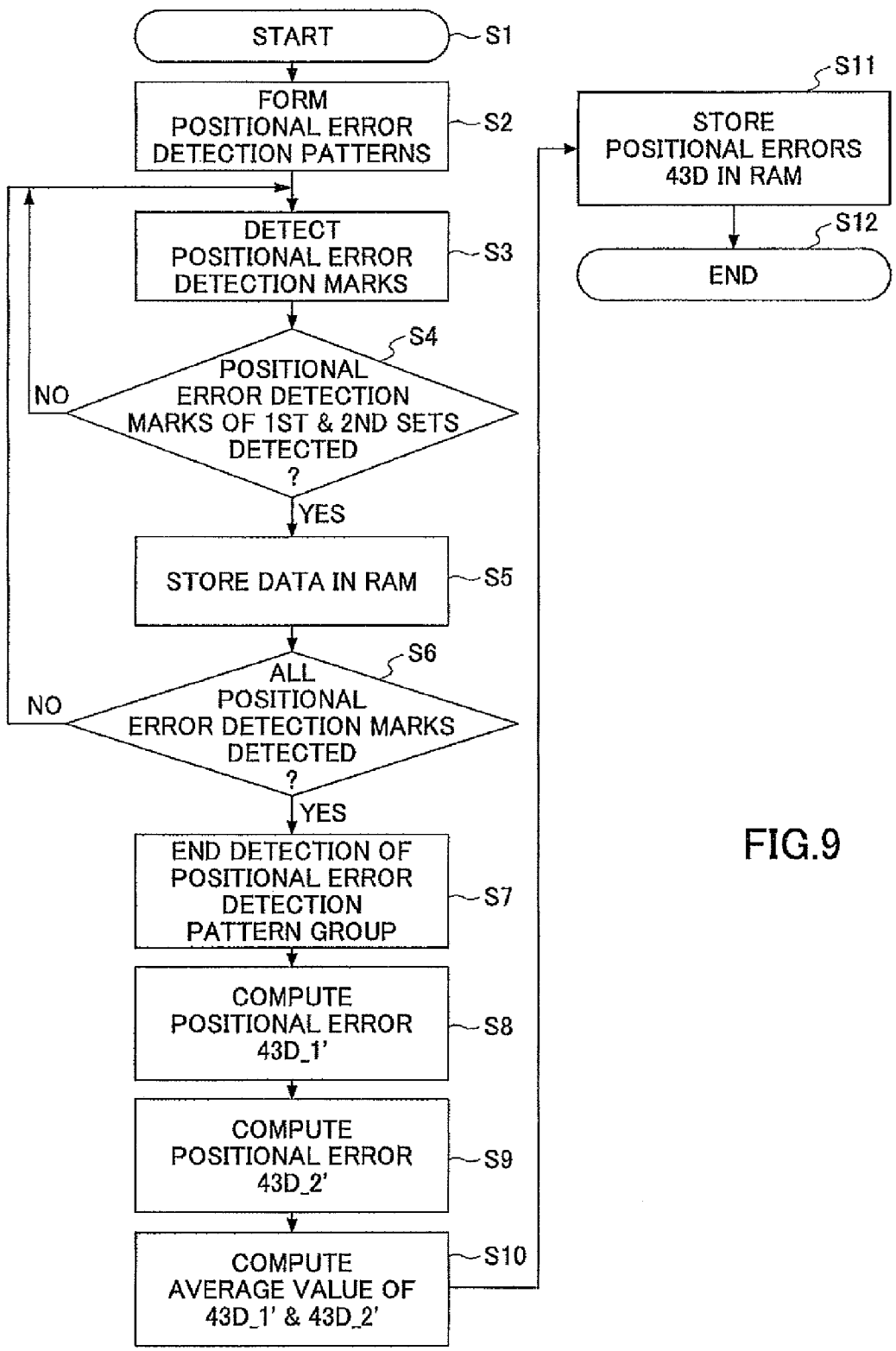
FIG. 9 is a flow chart for explaining a processing procedure of the positional error detection apparatus of the embodiment of the present invention.

Processing Procedure of Positional Error Detection Apparatus:

Next, a description will be given of the processing procedure of the positional error detection apparatus 100 of this embodiment, by referring to FIG. 9. FIG. 9 is a flow chart for explaining the processing procedure of the positional error detection apparatus 100 of this embodiment of the present invention.

The process of the positional error detection apparatus 100 shown in FIG. 9 starts in a step S1. In a step S2, the positional error detection patterns (or toner images of the positional error detection marks 25) shown in FIG. 3 are formed on the transport belt 5 by the image forming parts 6BK, 6M, 6C and 6Y. First, the image forming part 68K forms the black positional error detection pattern on the transport belt 5 which moves in the transport direction. Thereafter, the image forming parts 6M, 6C and 6Y successively form the magenta, cyan and yellow positional error detection patterns on the transport belt 5 in this order.

In a step S3, each of the sensors 17, 18 and 19 detects the corresponding positional error detection marks 2 which are formed on the transport belt 5. More particularly, in each of the sensors 17, 18 and 19, the light emitting part 23 irradiates light on the corresponding positional error detection marks 25 on the transport belt 5, and the light receiving part 24 detects the positional error detection marks 25 from the reflected light from the positional error detection marks 25 on the transport belt 5. In addition, the detection signal output from each of the sensors 17, 18 and 19 is temporarily stored in the FIFO memory 48 via the amplifier 44, the filter 45 and the A/D converter 46.

In the following description, the process will only be described with respect to the detection signal output from the sensor 17, and a description of the process with respect to the detection signals output from the sensors 18 and 19 will be omitted because the process with respect to the detection signals output from the sensors 18 and 19 is the same as the process with respect to the detection signal output from the sensor 17.

A step S4 decides whether or not the positional error detection marks 25 of the first and second sets are detected by the sensor 17. If the decision result in the step S4 is YES, the data stored in the FIFO memory 48 are stored in the RAM 52 via the I/O port 49 and the data bus 50. On the other hand, if the detection result in the step S4 is NO, the process returns to the step S3 to continue detecting the positional error detection marks 25.

After the step S5, a step S6 decides whether or not all of the positional error detection marks 25 of the positional error detection pattern group shown in FIG. 3, which is formed by twelve first sets and twelve second sets and detected by the sensor 17, are stored in the RAM 52. If the decision result in the step S6 is YES, the process of the sensor 17 to detect the positional error detection pattern group ends in a step S7. On the other hand, if the detection result in the step S6 is NO, the process returns to the step S3 to continue detecting the positional error detection marks 25 of the positional error detection pattern group.

After the step S7, the CPU 51 computes the positional error 43D_1' in a step S8 with respect to each of magenta, cyan and yellow, using the image positions of first and third positional error detection marks 25 in the twelve first sets of the positional error detection pattern group. In the case of the process with respect to magenta, the positional error 43D_1' (=42BK_1−(42M_1+41_Y+41_S)) shown in FIG. 7 is computed for each first set, with respect to the black and magenta positional error detection marks 25 included in the twelve first sets shown in FIG. 3, and an average value of the computed positional errors 43D_1' is computed. The positional error 43D_1' is similarly computed with respect to the black and cyan positional error detection marks 25 included in the twelve first sets, and with respect to the back and yellow positional error detection marks 25 included in the twelve first sets.

The CPU 51 computes the positional error 43D_2' in a step 39 with respect to each of magenta, cyan and yellow, using the image positions of second and third positional error detection marks 25 in the twelve second sets of the positional error detection pattern group. In the case of the process with respect to magenta, the positional error 43D_2' (=(42M_2+41_Y+41_S)−42BK_2) shown in FIG. 7 is computed for each second set, with respect to the black and magenta positional error detection marks 25 included in the twelve second sets shown in FIG. 3, and an average value of the computed positional errors 43D_2' is computed. The positional error 43D_2' is similarly computed with respect to the black and cyan positional error detection marks 25 included in the twelve second sets, and with respect to the back and yellow positional error detection marks 25 included in the twelve second sets.

The CPU 51 computes an average value of the positional errors 43D_1' and 43D_2' in a step S10, with respect to each of magenta, cyan and yellow The computed average values for magenta, cyan and yellow are set as the positional errors 43D in the direction perpendicular to the transport direction of the transport belt 5 for the image positions of magenta, cyan and yellow, with respect to the image position of black which is used as the reference. In a step S11, the CPU 51 stores the positional errors 43D computed in the step S10 in the RAM 52. The process of the positional error detection apparatus 100 ends in a step S12.

Therefore, by performing the process described above using the positional error detection marks 25 of this embodiment, it is possible to provide a positional error detection apparatus which can improve the detection accuracy of the positional error between the positional error detection marks 25 of a reference color and the positional error detection marks 25 of colors other than the reference color.

This application claims the benefit of Japanese Patent Applications No. 2007-327773 filed on Dec. 19, 2007 and No. 2008-289134 filed on Nov. 11, 2008, in the Japanese Patent Office, the disclosures of which are hereby incorporated by reference.

Further, the present invention is not limited to these embodiments, but various variations and modifications may be made without departing from the scope of the present invention.

What is claimed is:

1. A positional error detection apparatus comprising:
    an image forming unit configured to form, on a belt to be transported in a transport direction, positional error detection marks in a first color which is used as a reference color and in a second color other than the first color, to be used for detecting a positional error between an image position of the first color and an image position of the second color;
    a reading unit configured to detect the positional error detection marks on the belt; and
    a computing unit configured to compute the positional error based on the positional error detection marks detected by the reading unit,
    wherein the positional error detection marks include first and second marks which extend linearly and are inclined in mutually opposite directions with respect to the transport direction, and third marks which extend linearly and are perpendicular to the transport direction.

2. The positional error detection apparatus as claimed in claim 1, wherein the image forming unit forms the first and third marks in the first and second colors a predetermined number of times on the belt, and forms the third and second marks in the first and second colors a predetermined number of times on the belt.

3. The positional error detection apparatus as claimed in claim 2, wherein the computing unit computes the positional error based on a first interval in the transport direction between mutually adjacent first and third marks and a second interval in the transport direction between mutually adjacent second and third marks.

4. The positional error detection apparatus as claimed in claim 3, wherein the computing unit computes the positional error based on a first difference between the first interval for the first color and the first interval for the second color, and a second difference between the second interval for the first color and the second interval for the second color.

5. The positional error detection apparatus as claimed in claim 3, wherein the computing unit computes at least one of the first and second intervals based on leading and trailing edges of the mutually adjacent marks detected by the reading unit.

6. The positional error detection apparatus as claimed in claim 1, wherein the image forming unit forms on the belt the first and second marks which are inclined by an angle Π/4 in mutually opposite direction with respect to the transport direction.

7. The positional error detection apparatus as claimed in claim 2, wherein a period of a first set made up of the third and first marks in the transport direction and a period of a second set made up of the third and second marks in the transport direction are the same and have a predetermined relationship relative to an image formation period of the image forming unit for one color.

8. The positional error detection apparatus as claimed in claim 7, wherein a period of a predetermined number of consecutive first sets in the transport direction and a period of the predetermined number of consecutive second sets in the transport direction are the same and have a predetermined relationship relative to an image formation period of the image forming unit for one color.

9. The positional error detection apparatus as claimed in claim 8, wherein the belt is formed by an endless belt, and a length of the predetermined number of consecutive first sets and the predetermined number of consecutive second sets in the transport direction is equal to a length of the endless belt.

10. A positional error detection method comprising: forming, on a belt which is transported in a transport direction, positional error detection marks in a first color which is used as a reference color and in a second color other than the first color, to be used for detecting a positional error between an image position of the first color and an image position of the second color;
   detecting the positional error detection marks on the belt; and
   computing the positional error based on the positional error detection marks detected by the detecting,
   wherein the positional error detection marks include first and second marks which extend linearly and are inclined in mutually opposite directions with respect to the transport direction, and third marks which extend linearly and are perpendicular to the transport direction.

11. The positional error detection method as claimed in claim 10, wherein the forming forms the first and third marks in the first and second colors a predetermined number of times on the belt, and forms the third and second marks in the first and second colors a predetermined number of times on the belt.

12. The positional error detection method as claimed in claim 11, wherein the computing computes the positional error based on a first interval in the transport direction between mutually adjacent first and third marks and a second interval in the transport direction between mutually adjacent second and third marks.

13. The positional error detection method as claimed in claim 12, wherein the computing computes the positional error based on a first difference between the first interval for the first color and the first interval for the second color, and a second difference between the second interval for the first color and the second interval for the second color.

14. The positional error detection method as claimed in claim 12, wherein the computing computes at least one of the first and second intervals based on leading and trailing edges of the mutually adjacent marks detected by the detecting.

15. The positional error detection apparatus as claimed in claim 10, wherein the forming forms on the belt the first and second marks which are inclined by an angle Π/4 in mutually opposite direction with respect to the transport direction.

16. A non-transitory computer-readable storage medium that stores a program which, when executed by a computer, causes the computer to perform a process comprising:
   an image forming procedure forming, on a belt which is transported in a transport direction, positional error detection marks in a first color which is used as a reference color and in a second color other than the first color, to be used for detecting a positional error between an image position of the first color and an image position of the second color;
   detecting procedure detecting the positional error detection marks on the belt; and
   a computing procedure computing the positional error based on the positional error detection marks detected by the detecting procedure,
   wherein the positional error detection marks include first and second marks which extend linearly and are inclined in mutually opposite directions with respect to the transport direction, and third marks which extend linearly and are perpendicular to the transport direction.

17. The non-transitory computer-readable storage medium as claimed in claim 16, wherein the image forming procedure forms the first and third marks in the first and second colors a predetermined number of times on the belt, and forms the third and second marks in the first and second colors a predetermined number of times on the belt.

18. The non-transitory computer-readable storage medium as claimed in claim 17, wherein the computing procedure computes the positional error based on a first interval in the transport direction between mutually adjacent first and third marks and a second interval in the transport direction between mutually adjacent second and third marks.

19. The non-transitory computer-readable storage medium as claimed in claim 18, wherein the computing procedure computes the positional error based on a first difference between the first interval for the first color and the first interval for the second color, and a second difference between the second interval for the first color and the second interval for the second color.

20. The non-transitory computer-readable storage medium as claimed in claim 18, wherein the computing procedure computes at least one of the first and second intervals based on leading and trailing edges of the mutually adjacent marks detected by the reading detecting procedure.

21. An image forming apparatus comprising:
   a belt configured to be transported in a transport direction;
   an image forming unit configured to form positional error detection marks on the belt in a first color and in a second color other than the first color, to be used for detecting a positional error between an image position of the first color and an image position of the second color;
   a reading unit configured to detect the positional error detection marks on the belt; and
   a computing unit configured to compute the positional error based on the positional error detection marks detected by the reading unit,
   wherein the positional error detection marks include first and second marks which extend linearly and are inclined in mutually opposite directions with respect to the transport direction, and third marks which extend linearly and are perpendicular to the transport direction.

22. The image forming apparatus as claimed in claim 21, wherein
   the reading unit includes a light emitting element configured to irradiate the belt by light emitted therefrom, and a light receiving element configured to receive the light reflected from the belt;
   a line width of the positional error detection marks in the transport direction of the belt is approximately equal to a spot diameter of the light irradiated on the belt; and an interval of the positional error detection marks is set larger than a spot diameter of a diffused reflection light component.

23. The image forming apparatus as claimed in claim 21, further comprising:

a storage unit configured to store the positional error computed by the computing unit.

* * * * *